Feb. 27, 1968 W. L. HURFORD 3,371,160

TELEVISION CIRCUIT FOR NON-ADDITIVELY COMBINING A PAIR OF VIDEO SIGNALS

Filed Jan. 31, 1964 2 Sheets-Sheet 1

INVENTOR.
WINSLOW L. HURFORD
BY
W. H. Sprague
Attorney

INVENTOR.
WINSLOW L. HURFORD
BY
W. H. Sprague
Attorney

United States Patent Office 3,371,160
Patented Feb. 27, 1968

3,371,160

TELEVISION CIRCUIT FOR NON-ADDITIVELY COMBINING A PAIR OF VIDEO SIGNALS

Winslow Leroy Hurford, Collingswood, N.J., assignor to Radio Corporation of America, a corporation of Delaware Filed Jan. 31, 1964, Ser. No. 341,575
5 Claims. (Cl. 178—7.1)

ABSTRACT OF THE DISCLOSURE

Video signals from a pair of independent video sources are combinated non-additively using a simple diode or transistor mixing circuit, which continually provides at its output whichever input signal is greater in a given polarity direction (e.g., whichever signal is "whiter"). Lap dissolve amplifier advantageously incorporates such a mixing circuit for combining its channel inputs. Superposition of white letters on a background scene is readily achieved with such aparatus, without disadvantages of background contrast reduction and letter intensity and width modulation. Additionally, lap dissolve circuitry is used to advantage as keyed channels for achieving "wipe" and other insert effects without deleterious edge transient effects.

The present invention relates generally to apparatus for combining a plurality of video signals to obtain a composite video signal, and particularly to such combining apparatus as may, for example, advantageously perform such television studio effects as "montage," "lap dissolve," "wipe," etc.

In the development of television signals for transmission to receivers, it is often desired to combine signals from two or more independent sources. One example of such combination occurs when it is desired to superimpose upon a picture of a particular scene of action, an identifying label or other word message. Another example occurs when a split screen effect is desired (i.e. when it is desired to display two separate scenes of action simultaneously in mutually exclusive segments of the display raster). Other examples of the need for signal combination are associated with the transition from one scene of action to another, where the subjective effect of suddenly substituting the new scene for the old is found to be objectionable. One way of achieving the gradual transition from one scene to another is by use of the so-called "lap dissolve" effect, where the old scene gradually fades away at the same time as a super-imposed new scene becomes more and more visible. This is in contrast with the so-called "fade" effect where the old scene fades completely to black, and is then followed by the gradual brightening from black to the new scene.

Another transition effect involving signal combination is the so-called "wipe" effect, where a particular segment of the old scene is replaced by a corresponding portion of the new scene, and the portion of the viewed picture occupied by the new scene gradually enlarges until it encompasses the full viewing screen. The effect is akin to the old scene being wiped away to reveal a new scene underneath. The wipe may be from a variety of directions (e.g., from left to right, from top to bottom, from corner to diagonally opposed corner, from the center out, etc.), and the gradually enlarging new scene area may be enclosed by any of a variety of outlines (e.g., square, rectangle, circle, cross, keyhole, etc.).

While it may be appreciated that each of the various effects cited above may necessarily involve apparatus peculiar to the achievement of the particular combining effect desired, all share the necessity of providing at some point for the actual combination or mixing of signals from different sources. The present invention is directed to novel and improved apparatus for achieving the mixing of independent video signals in a manner providing distinct performance advantages, and in many utilizations, permitting significant simplification of the apparatus. A feature of the present invention is the use, in performing the video signal combining function, of simple mixing circuitry which achieves a "non-additive" form of video signal mixing.

To appreciate the nature and advantages of the contemplated "non-additive" video signal mixing, it is in order to first consider a relatively simple case of "montage"—where it is desired to superimpose the letters of a particular message upon the picture of a particular scene being televised. It shall be assumed that it is desired to display the message in white letters. In conventional television signal mixing equipment presently used in television studios, the mixing of the video signals representative of the background picture and the video signals representative of the message to be superimposed takes place in a video amplifier which achieves a conventional additive mixing of the video signals. That is, at those instants of time when both signals are present, the output of the video signal mixing equipment corresponds to the sum of the two input signals. There are several annoying consequences of this mode of operation. One effect is the attendant requirement for the reduction of the contrast of the background picture; this inherently results because the peak light of the combined signal will necessarily substantially exceed the peak signal capacity of the system, unless the level of the background picture is reduced to allow the new "sum" peak to be accommodated. This is particularly bothersome on a color broadcast where the necessary background picture adjustment results in a significant alteration of chroma or saturation of the picture colors.

Another effect of the usual additive mixing is modulation of the letter intensity by the background video signals. In other words, letters do not have a constant intensity, but rather vary in accordance with the brightness of the picture portions upon which they are superimposed. A further deleterious effect of the effect of the mixing is a modulation of the letter width in accordance with the background video. Due, among other things, to the finite bandwidth of the television channel and processing equipment, the aparent width of the letters as subjectively viewed will vary in accordance with the intensity and character of the associated background video portion.

In accordance with the principles of the present invention, whereby the video signal mixing is achieved in a non-additive manner, the above-noted disadvantages may be conveniently avoided. In accordance with an embodiment of the present invention, where the non-additive mixing action is simply achieved using a circuit arrangement which delivers to an output terminal only one of the input signals, the particular one delivered being dependent on which of the input signal is "whiter" than the other, white letters may be superimposed upon a background picture without attendant decrease in background contrast, and without modulation of the letter intensity or width by the background video information.

The nature of the non-additive mixing circuitry embodying the present invention is readily adapted to its use as the mixing circuitry of a so-called "lap dissolve" amplifier. In such an amplifier a pair of individually gain controlled video channels feeds a video signal mixing circuit. By suitable sequential or conjoint control of the respective channel gains, the amplifier may be used for "fade," "lap dissolve" or "superposition" of video signals from a pair of independent sources.

By feeding the background video signals and the letter channel gains, the amplifier may be used for "fade," "lap dissolve" amplifier incorporating a non-additive mixing circuit, the desirable results described above for the message superposition example may readily be achieved therein.

A variety of "wipe" effects may also be advantageously obtained by supplying the "wipe" keying signals to the respective channels of the "lap dissolve" amplifier incorporating the non-additive mixing circuit. By the simple provision of ensuring a slight overlap between the keying signal that turns the first video channel on and the keying signal that turns the second video channel on, certain deleterious transient effects that heretofore have accompanied "wipe" operations are conveniently avoided. In the past, when the outputs of two keyed video signal channels were combined to provide a "wipe" effect, the transition between the respective scene portions of the composite image was marked by either a very bright line or a very dark line; also the brightness along this noticeable line of transition was not necessarily of constant intensity, but rather was often accompanied by a twinkling effect. The presence of the noticeable transition line was due to the following: (*a*) If there was an overlap between the key-on signals applied to the two video channels, the prior art mixing circuit of the additive type provided a double video signal in this transition region, since the signals from both channels were added together in the output; (*b*) If, on the other hand, there was an underlap of the two keying signals (i.e., the key-on signal in one channel ended before the key-on signal in the other channel started), there was an absence of video information from the transition region, thereby producing the black line effect.

However, when, in accordance with the present invention, the outputs of the two keyed video signal channels are combined in a non-additive mixing circuit, which passes, for example, only the whitest signal, the bright or dark line transitional effect may be completely avoided by simply assuring the existence of a slight overlap. In the overlap region, the double video signal will not appear in the output circuit, since the non-additive mixing circuit will not combine the two video signals when both channels are on, but will simply pass on the whitest of the two at that instant.

By using the video signal channels of a lap dissolve amplifier as the keyed signal channels for obtaining wipe effects with the non-additive mixing circuit of the present invention serving to combine the respective signal channel outputs, whether keyed for wipe effects or not, considerable simplification of special effects circuitry, as well as attendant switching apparatus, may be obtained, in comparison with such circuitry and attendant switching apparatus as heretofore considered to be necessary.

Certain of the simplifications realized are believed to be readily apparent: i.e., the elimination of redundant circuits through the use of the same mixing circuitry for both lap dissolve and wipe effects, and the use of the lap dissolve amplifier channels themselves as the channels subject to keying for wipe effects. Other simplifications, however, particularly with regard to the associated switching circuitry, that are also a result of the above-described combining of operations, may be less apparent without a consideration of the special demands that may be imposed on the equipment in actual program use. It is sometimes desired to provide a partial "wipe" between two subjects, to be followed by a lap dissolve into a third scene. Another effect that is sometimes desired is the provision of a composite scene split between two independent scenes in accordance with some geometrical pattern with a letter message additionally superimposed on the split scene. It also may be desired to lap dissolve from one scene to another, to be immediately followed by a partial or full wipe to reveal an additional scene.

In prior art arrangements where wipe effects and lap dissolves are provided by separate apparatus, each involving at least a pair of video signal channels culminating in a mixing circuit, achievement of complex effects such as those just described required the ability to cascade the lap dissolve and wipe effects amplifiers, with provision for the possible cascading of these amplifiers in either direction. That is, one needed the ability to provide both for the use of the lap dissolve amplifier output as one of the inputs to the wipe effects amplifier, and for use of the output of the wipe effects amplifier as one of the inputs to the lap dissolve amplifier. These requirements necessitated association with the lap dissolve and wipe effects amplifiers of complicated video switching circuitry to facilitate all of the possible combined uses of the various video effects. The previously indicated combination of wipe effects and lap dissolve functions in the same amplifier channels, leading to a common mixing circuit, allows considerable simplification of the required video switching apparatus.

Thus, it is a primary object of the present invention to provide novel and improved apparatus for combining signals from a plurality of independent video signal sources.

It is a further object of the present invention to provide improved video signal mixing circuitry permitting achievement of various multiple image effects without producing certain undesired accompanying visual effects that characterized the achievement of such effects in video signal mixing efforts of the prior art.

It is an additional object of the present invention to provide novel and simplified apparatus providing a common facility for achieving various multiple image video effects heretofore accomplished in separate units of more complex circuit complement, the common facility requiring attendant video switching apparatus simplified in form relative to that attending use of the separate units of the prior art.

Other objects and advantages of the present invention will be readily recognized by those skilled in the art after a reading of the following description and inspection of the accompanying drawing in which:

FIGURE 1 illustrates, in partial block and partial schematic form, an embodiment of the present invention providing for the non-additive mixing of video signals from a pair of video signal sources;

FIGURE 1*a* illustrates graphically video signal waveforms of aid in explaining the operation of the apparatus of FIGURE 1.

Figures 1, 1A, 3, 3A:
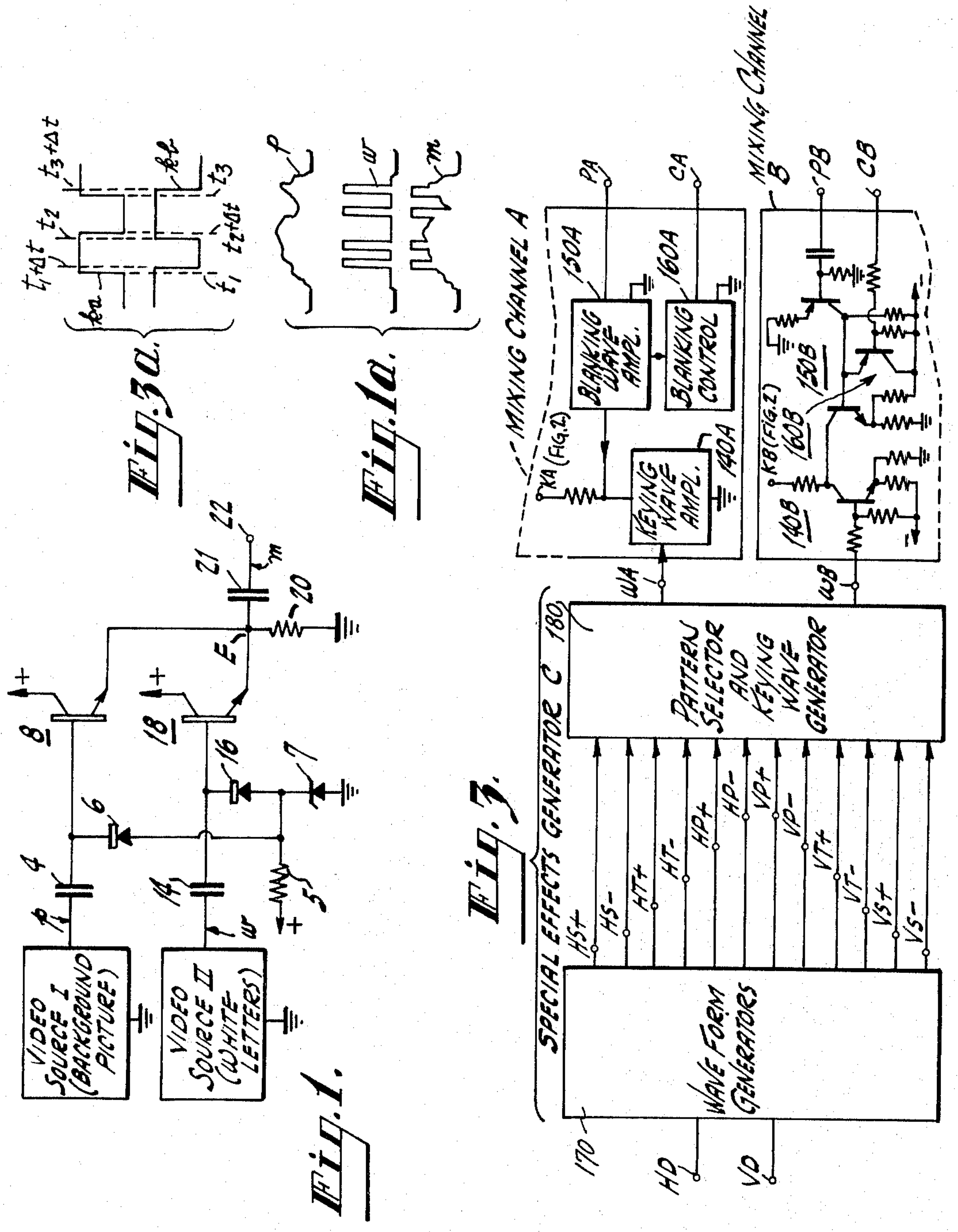
FIGURE 3 illustrates a modification of the lap dissolve amplifier circuitry of FIGURE 2, the modification enabling use of the lap dissolve amplifier channels as the keyed video signal channels of a wipe effects arrangement.
FIGURE 3*a* illustrates graphically keying signal waveforms, of aid in explaining the operation of the apparatus of FIGURE 3.

FIGURE 1 illustrates a relatively simple application of the principles of the present invention to the solution of a particular video effects problem; viz., the superposition of a white letter message on another televised scene. Video signals representative of the background picture being televised originate from a suitable source, shown only in block form and designated Video Source I in the drawing; the source of video signals corresponding to the white letter message to be superimposed is represented in the drawing by the block labeled Video Source II. The respective signal outputs of Source I and Source II are shown in FIGURE 1*a* by illustrative waveforms *p* and *w*, respectively. The outputs are of the same polarity; i.e., illustratively, both are of "black-negative" polarity, whereby the white peaks of each signal are positive-going. The respective inputs signals are not composite video signals (i.e., sync has not been added) but do include periodic blanking peaks in the black direction.

The output of Source I is coupled via a capacitor 4 to the base of an NPN transistor 8, while the output of Source II is similarly coupled via a capacitor 14 to the base of a second NPN transistor 18. A DC restorer diode 6 is connected between the base of transistor 8 and a point of stable DC potential, positive relative to chassis ground; the latter point being established at the junction of a resistor 5 and a zener diode 7 (connected in series, in the order named, between the positive terminal of a DC supply and chassis ground). The diode 6 is connected in such polarity as to conduct whenever the base of transistor 8 is more negative than the potential at the resistor 5–zener diode 7 junction. Another DC restoring diode 16 is similarly connected between the base of transistor 18 and the resistor-zener diode junction.

The diodes 6 and 16, in cooperation with the respective capacitors 4 and 14, and in accordance with well known DC restoration principles, serve to restore the DC components of the outputs of the respective video signal sources and establish the negative (black) peaks of both signals at the same positive DC potential. The collectors of transistors 8 and 18 are connected to the positive DC supply terminal, while the emitters of both transistors are connected directly together (providing a common emitter terminal E), and are returned to chassis ground via a common emitter resistor 20.

The illustrated signal combining apparatus is provided with an output terminal 22, coupled by a capacitor 21 to the common emitter terminal E. The mixed video output appearing at output terminal 22 is illustratively shown in FIGURE 1*a* by waveform *m*.

Comparison of the output waveform *m* with the two input waveforms *p* and *w* demonstrates the "non-additive" character of the signal mixing achieved by the FIG. 1 apparatus. The waveform *m* does not represent the sum of the two input signals; rather, it represents at each instant whichever of the two input signals is more "white," i.e. following the variations of the most positive of the two input signals at all instants.

Achievement of this result involves the functioning, or attempted functioning, of each of the transistors 8 and 18 as an emitter follower. In each case, so long as the transistor base is more positive than the emitter terminal E, the transistor is rendered conducting, and voltage at the emitter tends to follow (with only slight reduction in amplitude) the voltage at the base. However, with both transistor emitters tied directly together, the common terminal E will go almost as positive as the most positive of the two bases, with the result that the least positive of the two bases will be negative relative to its emitter. Accordingly, the transistor with the least positive base will be cut off, and the signal variations at its base will not be repeated at the common terminal E. This transistor will continue in the state of cut-off until the signal on its base swings more positive than the signal on the other transistor base, whereupon the theretofore cut-off transistor will commence conducting, raising the emitter terminal E to its base potential, and in the process driving the other transistor to cut-off.

The practical advantages of the simply achieved non-additive mixing of video signals for the example of white letter message superposition are marked, as previously discussed. With the white letter peaks of the output of Source II set at an appropriate high level, each letter representative peak will drive the output waveform *m* to the same white level irrespective of the particular background picture variations occurring during the letter interval. With the background picture channel effectively cut off during each letter peak appearance, the message letters will appear in the reproduced scene free of brightness modulation by the background picture information. Also the letter peaks in the output waveform *m* will be accurate replicas in width of the letter peaks in the input waveform *w*, unaffected, for example, by the presence or absence of steeply sloping variations in the time-coincident portions of the background input waveform *p*. Additionally there is no need for drastic reduction of the gain of the background picture channel in order to accommodate "sum" peaks during the letter signal occurrences, since the letter peaks do not add to the coincident background picture signals but merely supplant them.

It may be noted that in the prior art, an alternative existed to simply mixing background picture and letter signals to achieve the message superposition effect, such alternative involving the use of the letter signals to key holes in the background picture signal; the keyed background picture signal is then combined either with the letter signals, or with a keyed constant white signal. While this alternative provided a way of avoiding the undesired letter modulation effects noted above, and could also eliminate the need for drastic change in the background picture gain, it involved far more complex operations than the simple non-additive mixing technique herein described. Moreover, the hole keying technique had the distinct drawback of an accompanying undesired "twinkling" edge effect due to the consequence of noise in the keying channel. The "twinkling" edge effect is completely avoided in use of the non-additive mixing operations of the present invention.

Figure 2:
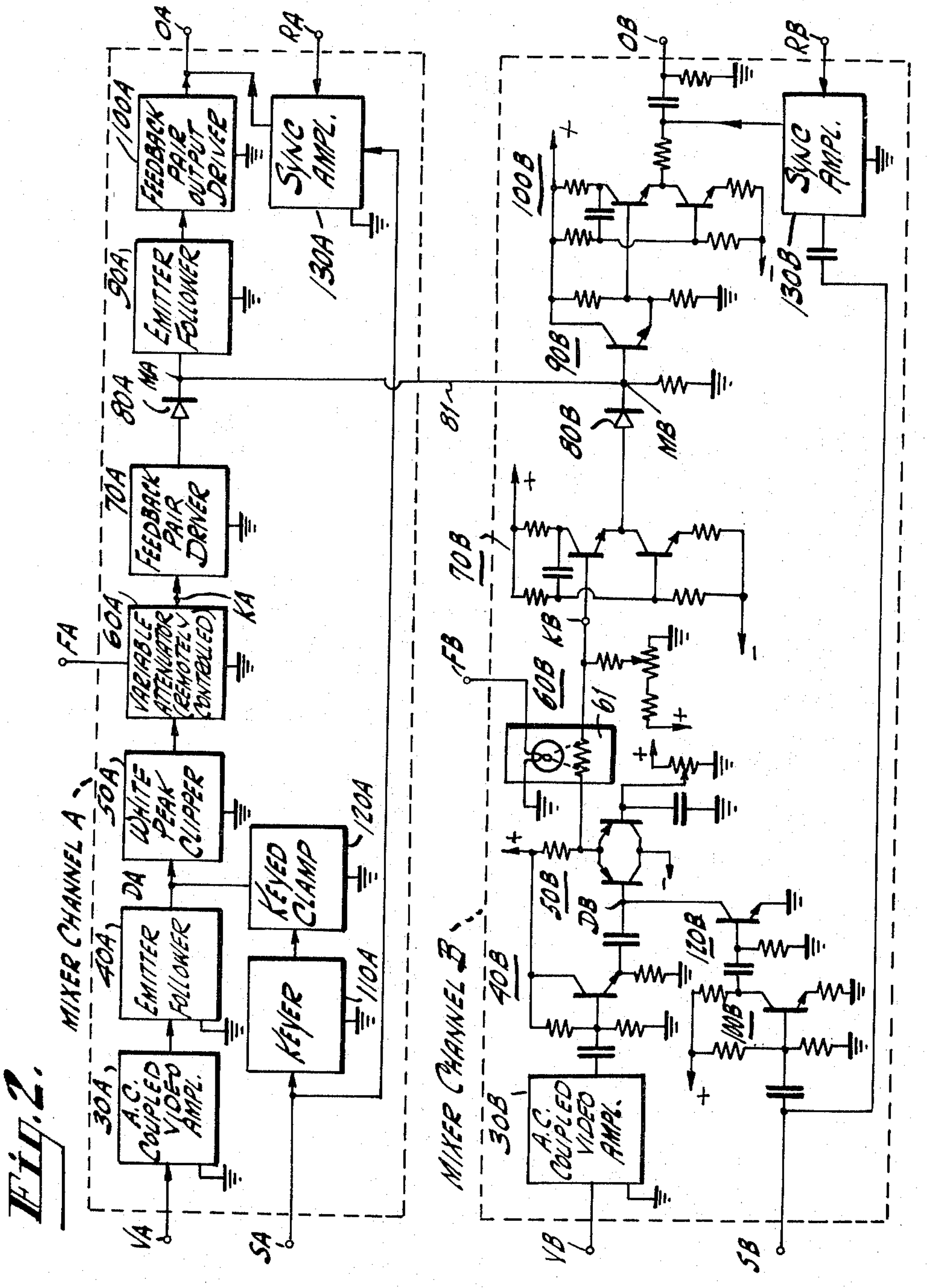
FIGURE 2 illustrates, in partial block and partial schematic form, lap dissolve amplifier circuitry in accordance with the principles of the present invention, the amplifier circuitry incorporating a non-additive mixing circuit comprising a modification of the non-additive mixing circuitry of FIGURE 1.

FIGURE 2 illustrates application of the present invention to so-called "lap dissolve" amplifier apparatus. Such equipment can be used not only for superposition effects such as described above, but also for scene transitions, such as the previously described fades and lap dissolves. Illustratively, the lap dissolve amplifier comprises two identical signal channels, designated mixer channel A and mixer channel B in FIGURE 2. For the sake of simpliciy in the drawing, mixer channel A has been illustrated in block diagram form only (except for the showing of the mixing diode 80A), and schematic details for the channel equipment have been shown only in mixer channel B. Corresponding equipment in the respective mixer channels have been given the same reference numeral followed by the channel letter. Thus, for example, the schematic details of the block labelled white peak clipper and designated 50A in mixer channel A conforms to the illustrated schematic detail of the circuitry designated 50B in mixer channel B.

Referring first to mixer channel A for an explanation of the makeup of each mixer channel in functional terms, the mixer channel is provided with an input terminal VA to which is supplied a video signal from a first source. The video input signals are amplified in an AC coupled video amplifier 30A, which drives an emitter follower stage 40A. The emitter follower output is supplied to the input terminal DA of a white peak clipper 50A, which serves to limit the peaks of the video signal in the white direction at a selected level. A keyed clamp circuit 120A is associated with the coupling of the emitter follower 40A to the white peak clipper 50A, and serves to reinsert the DC component of the incoming video signal at the clipper input terminal DA. The keyed clamp 120A references the output of the emitter follower 40A to a fixed clamping level during periodically recurring clamping intervals in response to the output of the keyer 110A. The output of keyer 110A is derived from and responsive to a synchronizing signal supplied to the sync input terminal SA of mixer channel A.

The output of the white peak clipper stage is supplied to a variable attenuator 60A, providing a variable amplitude output at its output terminal KA. The variable attenuator 60A is subject to remote control, responding to a fade control voltage supplied to a control voltage input terminal FA. The gain controlled output of attenuator 60A, appearing at terminal KA, drives a mixing diode 80A via a driver stage 70A of the so-called "feedback pair" type.

The mixing diode 80A is provided with an output terminal MA, to which a connection from the other mixing channel is made, as will be discussed subsequently. The signals appearing at the output terminal MA are applied via an emitter follower stage 90A to an output driver stage 100A, the latter driver stage also being of the "feedback pair" type.

The mixer channel A also includes a sync amplifier 130A, which receives an input from the previously mentioned sync input terminal SA. The sync amplifier output is added to the output of driver 100A at the mixer channel output terminal OA. However, the sync amplifier 130A is subject to remote disabling or enabling under the control of a sync adder control voltage supplied to the amplifier 130A via the control voltage input terminal RA.

While it is not believed essential to describe the schematically illustrated circuitry of mixer channel B in exhaustive detail, several comments are in order with regard to the particlular form of the circuit units.

It will be noted that the keyed clamp 120B employs a transistor as the clamping device. In operation, this transistor is normally nonconductive, but rendered periodically conducting in response to each keying pulse supplied by keyer 100B. When rendered conducting, the clamping emitter-collector path of the clamping transistor presents a low impedance path between the clipper input terminal DB and chassis ground, whereby the charge on a capacitor coupling the emitter follower 40B to the terminal DB will be adjusted in the proper direction for DC reinsertion. The polarity of the video signal supplied to input terminal VB is chosen relative to the number of phase inversions provided in the video amplifier 30B so as to develop a signal at the output of emitter follower 40B having a black-negative polarity.

The white peak clipper 50B comprises a pair of PNP transistors sharing a common emitter resistor. The base of one PNP transistor is directly connected to the clipper input terminal DB; the base of the other PNP transistor is bypassed to ground for signal frequencies by a large capacitor, and set at a selectable positive DC bias level. In operation, the first transistor operates essentially as an emitter follower, repeating at the common emitter terminal the signal variations appearing at input terminal DB, except that when the white peaks of the signal at DB attempt to drive the common emitter more positive than the selected positive bias on the base of the other transistor, the latter conducts, and its conducting emitter-base path effectively clamps the emitter output terminal to the selected bias level. The first transistor is rendered nonconducting and remains so until the signal on the first transistor's base again drops below this bias level.

The variable attenuator 60B is shown as utilizing a device 61, known commercially as a Raysistor. Such a device incorporates a light source of controllable energization and a light dependent resistor element subject to an illumination by the controllable light source. Such a device is convenient for remote gain control applications. A remotely developed control voltage may be applied (as via terminal FB) to vary the illumination provided by the light source; the illumination variations effect a change in the impedance presented by the light dependent resistor, which, if suitably connected in the signal handling circuit, in turn produces a variation in the amplitude of the signal being processed. The amplitude control is thus effected with essentially complete isolation between the control voltage source and the signal channel being controlled.

In the circuit arrangement of FIGURE 2, the light dependent resistor segment of device 61 is used as a portion of a voltage-divider connected across the output of clipper 50B. When the light source segment of device 61 is dimly lit or extinguished the light-dependent resistor's high impedance strongly attenuates the video signal. Increasing the energization of the light source by increasing the control voltage at terminals FB reduces the signal attenuation.

Each of the driver stages 70B and 100B are of similar circuit configuration, employing a pair of transistors of the same conductivity type (illustratively, NPN). The emitter-collector paths of the two transistors are connected in series between a positive DC supply terminal and a negative DC supply terminal: the collector of a first one of the transistors being connected via a collector load resistor to the positive terminal, the emitter of the first transistor being directly connected to the collector of the second, and the emitter of the second transistor being connected via an emitter load resistor to the negative supply terminal. Each of the bases is supplied with a forward bias, and the capacitor provides a signal path from the collector of the first transistor to the base of the second transistor. Operation of the circuit may be explained from several viewpoints. The first transistor may be viewed as an emitter follower, provided, however, with a variable emitter load (the second transistor serving as part of the emitter load of the first). The second transistor may be viewed as a conventional collector output amplifier, provided, however, with a variable collector load (the first transistor constituting part of the collector load of the second). From another point of view, the circuit may be viewed as a voltage divider connected between the positive and negative supply terminals, with variations in the impedance of the divider portion above the intermediate output terminal (at the junction of the first transistor emiter and the second transistor collector) being accompanied by opposite direction variations in the impedance of the divider portion below the divider output tap.

The mixing apparatus of the FIGURE 2 embodiment of the invention differs from the mixing apparatus of FIGURE 1 in its employment of diodes as the mixing devices, in contrast with the use of transistors in the FIGURE 1 circuit. It will be observed, however, that the non-additive character of the mixing is still obtained. To effect the desired mixing of the respective inputs to the two mixer channels, a direct connection is provided between the output electrodes (illustratively: cathodes) of the mixing diodes (80A and 80B) of the two mixer channels. Each of the mixing diodes performs in a manner equivalent to the respective emitter-base diodes of the mixing transistors of FIGURE 1. Thus, for example, the voltage at the mixer output terminal MB will follow the voltage at the output terminal of driver stage 70B, so long as the latter is more positive than the voltage terminal MB, whereby the diode 80B may provide a conducting path therebetween. The same observation may be made with regard to terminal MA and the output of the driver stage 70A. However, since the terminals MA and MB are directly connected together, and thus provide a common output terminal, this terminal will follow the most positive of the two driver stage outputs. In so doing, it will reverse bias the mixing diode associated with the driver stage having the least positive output, thus blocking signal passage from that driver stage. Of course, whenever the driving voltage in the blocked channel goes more positive than the driver output in the unblocked channel, the roles will reverse, and the signal at the common output terminal will now follow the variations in the previously blocked channel.

The circuitry of FIGURE 2 provides facility for more complex effects than the simple superposition effect described in connection with the FIGURE 1 apparatus. For example, a lap dissolve type of transition from one scene of action to another may readily be achieved through appropriate use of the respective variable attenuators 60A, 60B.

To illustrate this achievement, it shall be assumed that the "old" scene is represented by video signals supplied to the input terminal VA of mixer channel A, while the "new" scene is represented by video signals supplied to the input terminal VB of mixer channel B. A lap dissolve transition between the two scenes is effected by conjoint increase in the attenuation provided by variable attenuator 60A and decrease in the attenuation provided by variable attenuator 60B. This result may be obtained by supplying an illumination decreasing control voltage to the fader control voltage input terminal FA simultaneously with the application of an illumination increasing control voltage to the fader control voltage input terminal FB. As the new scene signal in channel B increases in amplitude, various segments of the signal output of driver stage 70B will start to exceed the level of the time coincident segments of the signal output of driver stage 70A, and these new scene segments will appear at the common output terminal of the mixing diodes. As the channel B gain continues to go up and the channel A gain to go down, more and more segments of the new scene signal will exceed their couterparts in the old scene signal, and thus will supplant the old scene information in the mixer output. When the process is concluded, the old scene will have been completely replaced by the new scene. The transition between scenes, however, will have been achieved with a visual effect describable as the old scene dissolving into the new.

By virtue of the connection 81 between the mixing diode output terminals MA and MB, and the consequent mode of operation described above, it will be appreciated that the video signal appearing at both output terminals OA and OB will be identical. It will be noted that each mixer channel is provided with a facility (the respective sync amplifiers 130A and 130B) for adding sync signals to this video output, if a composite video output signal is desired. Whether the particular sync amplifier is disabled or enabled (by application of the appropriate control voltage at terminal RA or RB) will depend upon the intended utilization of the output signal, and is at the option of the equipment user.

It has previously been mentioned that the non-additive mixing technique, such as is employed in the FIGURE 2 apparatus described above, may be used to advantage in the achievement of so-called "wipe" and related special video effects. FIGURE 3 is illustrative of an arrangement for using the mixing channels of a lap dissolve amplifier, such as discussed in connection with FIGURE 2, for such wipe effect purposes. For such purposes, it is contemplated that the mixing channels of FIGURE 2 will be modified by the addition of certain apparatus to aid in achieving the additional effects.

To simplify the drawing, the original circuitry illustration of the mixing channels has not been repeated in FIGURE 3; rather, only the added circuitry has been shown, with an indication of its link to the FIGURE 2 apparatus. Additionally shown, in block form only, is the special effects generator (designated C), which provides the waveforms for driving the modified mixing channels to achieve the subject wipe effects.

In practice, the special effects generator C of FIGURE 3 may take the form of the RCA Type TG-25A Special Effects Generator (described in detail in instruction book IB-30535, published by the Industrial Electronic Products Division of Radio Corporation of America, Camden, New Jersey). In general, such generating equipment may be viewed as comprising two main units. A first unit comprises a plurality of waveform generators (block 170), which, in response to horizontal and vertical drive signals from a suitable source (such as a sync generator), generate a plurality of differently shaped and polarized waveforms at both horizontal and vertical deflection rates. As an example, the waveform generators 170 of FIGURE 3 have been illustrated as providing twelve separate output waveforms at twelve separate output terminals: HS+, HS−, HT+, HT−, HP+, HP−, VP+, VP−, VT+, VT−, VS+ and VS−; the generation of these waveforms is in response to one or another of the respective horizontal and vertical drive inputs supplied to the generator input termials HD and VD. The particular output waveforms contemplated are: mutually opposite polarity versions of a horizontal sawtooth wave at the respective output terminals HS+ and HS−; mutually opposite polarity versions of a horizontal triangular wave at the respective output terminals HT+ and HT−; mutually opposite polarity versions of a horizontal parabola wave at the respective output terminals HP+ and HP−; mutually opposite polarity versions of a vertical parabola wave at the respective output terminals VP+ and VP−; mutually opposite polarity versions of a vertical triangular wave at the respective output terminals VT+ and VT−; and mutually opposite polarity versions of a vertical sawtooth wave at the respective output terminals VS+ and VS−.

The second main unit of the special effects generator C is indicated in the drawing as the pattern selector and keying wave generator 180. This apparatus provides a facility for developing a pair of essentially complementary keying wave outputs, the character of the keying wave outputs being determinative of the insert or wipe effect achieved, and the keying wave generation being responsive to a selected one or a selected combination of the various output signals of the generator unit 170.

It is not essential to an understanding of the present invention to provide an explanation of the manner in which the special effects generator operates. However, to appreciate the character of its output signals, it is in order to consider an example of a relatively simple wipe type effect. It should be assumed that it is desired to provide a horizontal wipe transition between an old scene and a new scene. In such a transition, the new scene first appears along one edge (e.g., left edge) of the old scene. That is, the extreme left hand portion of the old scene is supplanted by the extreme left hand portion of a new scene. As the wipe progresses, the vertical line of transition between the new and old scenes moves to the right, revealing more and more of the new scene at the left side of the viewed picture. The wipe is completed when the vertical line of transition moves completely to the right, and the old scene has been completely replaced by the new scene. For certain effects the wipe may be only partial, with movement of the vertical line of transition being arrested at some intermediate position. This results in a split screen effect, with portions of two separate scenes of action being simultaneously displayed in mutually exclusive segments of the viewed picture.

The usual manner of achieving such a left-to-right horizontal wipe is to provide means for essentially complementary keying of respective signal channels carrying the new and old scene signals. At the beginning of the wipe, the channel keying is such that the new scene signal channel is keyed on only during the initial portion of each line interval of the new scene video signal, and is keyed off for all of the remainder of each line interval. The old scene signal channel, on the other hand, is keyed off during the initial portion of each line interval, and keyed on for all of the remainder of each line interval. As the wipe progresses, the key-on interval for the new signal channel lengthens, while the old scene channel is keyed on at later and later instants in each line interval. The special effects generator equipment serves to provide essentially complementary keying waveforms for the above-described keying of new scene and old scene channels.

In accordance with an embodiment of the present invention illustrated in FIGURE 3, the keying wave outputs of special effects generator C are applied to the mixing channels A and B of a lap dissolve amplifier as shown in FIGURE 2. The keying waveforms are available at respective output terminals WA and WB of the keying wave generator 180. Mixing channel A of the lap dissolve amplifier is modified by the addition of equipment including a keying wave amplifier 140A which responds to the keying signal at terminal WA, and delivers an amplified keying wave to terminal KA, at which point it adds to the gain controlled output of attenuator 60 that also appears there. In like manner the mixing channel B is modified by the addition of equipment including a keying wave amplifier 140B serving to deliver the keying signal at terminal WB to the terminal KB, where this keying signal is added to the output of attenuator 60B.

The waveforms *ka* and *kb* of FIGURE 3A are illustrative of the appearance of the respective keying signals at the outputs of amplifier 140A and 140B, respectively, at an intermediate point in the achievement of a horizontal wipe. These waveforms may be viewed as essentially complementary pulse trains. That is, the waveform *ka* includes successive positive going pulses which occur in substantial time coincidence with negative-going troughs in the pulse train of waveform *kb*. It will be observed, however, that the respective keying waveforms are not exactly complementary; rather, the positive pulses of the two pulse trains slightly overlap.

Thus, for example, at the time $t_1$, when a positive pulse commences in the waveform *ka*, the termination of a positive pulse in waveform *kb* has not yet been reached; this termination occurs shortly after, at time $t_1+\Delta t$. The positive pulse in waveform *ka* that commenced at time $t_1$ does not terminate until time $t_2+\Delta t$, which is shortly after the positive pulse beginning (at time $t_2$) in waveform *kb*.

As a result of this overlap condition, a positive pulse is always present at one or another or both of the keying insertion terminals KA and KB. The significance of establishing this condition will be more readily appreciated after considering the effect of the application of the respective keying waves to the mixing channels of the lap dissolve amplifier of FIGURE 2. It will be recalled that the operation of the mixing diodes of this apparatus is such that the channel with the least positive output from its diode driving stage will be blocked, while the other channel passes its signal to the common mixing diode output terminal. When keying signals of the character shown in FIGURE 3A are added to the respective video signals in the mixer channels, a complementary condition is established in the two channels (except in the overlap regions to be subsequently discussed). That is, when a positive pulse appears in waveform *ka*, the signals in channel A are elevated in the positive direction relative to the signals in channel B. Thus, if the positive pulse amplitude is sufficiently great, the elevated signals in channel A are passed to the common output terminal throughout this interval, to the complete exclusion of the signals in channel B. In a successive interval, however, when a positive pulse appears in the waveform *kb*, the signals in channel B are elevated in a positive direction relative to the signals in channel A, and the signals delivered to the common output terminal during this interval are exclusively the signals in channel B.

As noted previously, however, there are recurring transition intervals when the positive pulses of waveforms *ka* and *kb* overlap. During these overlap regions, the signals in both channel are raised in a positive direction, and thus neither is elevated relative to the other. Due to the non-additive character of the mixing provided by diodes 80A and 80B, the signal appearing at the common mixing diode output terminal during these overlap regions is not a double video signal (i.e., is not a summation of the two channel signals), but rather is equal to whichever of the two channel signals happens to be whiter during the overlap.

As discussed previously, the use of the deliberate key-on overlap with subsequent non-additive mixing provides distinctive advantages in the wipe effect achievement. It is virtually impossible to obtain exactly complementary keying signals for wipe effects. In prior art wipe effect circuitry, where the outputs of the respective keyed channels were combined by additive mixing, the region of transition between scenes in the viewed picture was either marked by a bright line due to double video signal production by overlapped key-on pulses, or a dark line representing video signal absence due to underlapped key-on pulses. In use of the apparatus of the present invention these undesired transient conditions are conveniently avoided.

FIGURE 3 illustrates further modification of mixing channel A by the addition of a blanking wave amplifier 150A delivering blanking waves from an input terminal PA for addition to the video signal at terminal KA. The blanking wave amplifier 150A may be disabled or enabled through use of a blanking control circuit 160A responsive to a blanking control voltage supplied to a control voltage input terminal CA. The mixing channel B is similarly modified. The function of the respective blanking wave amplifiers is associated with the use of mixing channels for wipe effect purposes. It is desired that switching from one channel signal to another is not caused to occur during the blanking interval by keying signal inputs, particularly when the signals being combined involve color signals having a color synchronizing burst present during the blanking interval. To ensure that the keying pulse inputs do not produce switching at this undesired time, the blanking wave addition is provided in each channel, with the added blanking wave being of such polarity as to constitute a key-on signal. When the mixer channels are used for lap dissolve purposes not involving the application of the keying waves, there is no need for the blanking wave addition, and the respective blanking wave amplifiers may be disabled via the respective blanking control circuits.

It will be seen that apparatus constructed as described in connection with FIGURE 3 can alternatively serve either lap dissolve or wipe effect purposes. If two such units are cascaded, with the output of the first constituting one of the inputs of the second, complex effects requiring a lap dissolve amplifier output to feed a wipe effects amplifier input are readily handled by operating the first unit as a lap dissolve amplifier and the second unit as a keyed wipe effects amplifier. Conversely, if a complex effect is desired that requires a wipe effects amplifier to drive a lap dissolve amplifier, the same cascaded units may be used without switching of inputs and outputs, since the first unit may now be operated as the keyed wipe effects amplifier, and the second unit may be operated as a lap dissolve amplifier.

Another manner in which the achievement of complex video effects may be facilitated through use of the structure of FIGURE 3 is by the addition of more than two mixer channels, with all mixing diode output terminals directly connected together. Since the nature of the mixing operation is such that only one signal is passed to the output terminal at all times, an unlimited number of inputs can conceivably be accommodated. A considerable simplification of video selection apparatus can thus conceivably be achieved by associating all video sources to be employed in a given program operation in paralleled mixer channels, and with gain control or keying of the various mixer channels determining the make up of the output signal.

What is claimed is:

1. Apparatus for producing a composite video signal representative of a composite image including at least one segment containing information derived only from a first video source and at least one additional segment containing information derived only from a second video source independent of said video source, said apparatus comprising the combination of:

a first viedo signal processing channel coupled to said first video signal source and including means for restoring the DC component of the signals from said first source;

a second video signal processing channel coupled to a said second video signal source and including means for restoring the DC component of the signals from said second source; and non-additive mixing means, coupled to receive inputs from both of said signal processing channels, for combining the DC restored signals from said two sources in such a manner as to produce a composite output signal corresponding at any instant to whichever of the inputs to the mixing means has the greatest amplitude excursion in a given polarity direction.

2. Apparatus for producing a composite video signal representative of a composite image including segments containing information derived from a first video source and additional segments containing information derived from a second video source independent of said video source, said apparatus comprising the combination of: a first video amplifier coupled to said first video source, and first DC restoration means coupled to said first video amplifier for establishing the peaks of the signal output of said first video amplifier which extend in black-representative direction at a predetermined reference level;

a second video amplifier coupled to said second video source, and second DC restoration means coupled to said second video amplifier for establishing the peaks of the signal output of said second video amplifier which extend in a black-representative direction at said predetermined reference level; and non-additive mixing means for producing an output corresponding to the desired composite video signal, said mixing means including first and second unidirectional current conducting devices, a common output terminal, means for coupling said first device between said first video amplifier and said common output terminal, means for coupling said second device between said second video amplifier and said common output terminal, the polarization of said second unidirectional device relative to said common output terminal corresponding to the polarization of said first unidirectional device relative to said common output terminal, the direction of such common polarization being chosen so that the composite signal developed at said common output terminal corresponds at any instant to the video amplifier signal output which most departs from said reference level.

3. Video signal combining apparatus comprising:

first and second video signal channels, each of said video signal channels including an input terminal, means for amplifying signals supplied to said input terminal, means coupled to said amplifying means for adjusting the amplitude of the output of said amplifying means, a current conducting device presenting a unidirectional current path between a pair of electrodes thereof, and means connecting said unidirectional current path between the output of said amplitude controlling means and an output terminal of said device; and means for directly connecting together the device output terminals of both of said video signal channels.

4. A television lap dissolve amplifier comprising a pair of video signal channels provided with separate video signal input terminals and separate channel gain controls;

means for non-additively mixing signals from both of said video signal channels to provide a composite output signal; and means selectively permitting use of said lap dissolve amplifier for achievement of wipe effects and the like, said last-named means comprising selectively energized means for adding one of a pair of essentially complementary pulse trains to the video signals in one of said channels and for adding the other of said pair of essentially complementary pulse trains to the video signals in the other of said channels prior to the application of both said channel signals to said mixing means.

5. Video signal combining apparatus comprising:

(1) a pair of video signal channels, each including an input terminal, means for amplifying and restoring the DC component of video signals appearing at said input terminal, said amplifying means being subject to selective gain control, a diode having an input electrode and an output electrode, and means for applying the output of said amplifying means to said diode input electrode;

(2) means for directly connecting together the diode output electrodes of both of said pair of video signal channels;

(3) selectively energized means for applying one of a pair of essentially complementary, but partially overlapping, pulse trains to the diode input electrode of one of said pair of video signal channels and for applying the other of said pair of pulse trains to the diode input electrode of the other of said pair of video signal channels; and (4) means for deriving a composite output signal from said commonly connected diode output electrodes.

References Cited

UNITED STATES PATENTS

| | | | |
|---|---|---|---|
| 3,300,631 | 1/1967 | Vallese | 328—160 XR |
| 2,653,186 | 9/1953 | Hurford | 178—7.1 |

FOREIGN PATENTS

| | | |
|---|---|---|
| 1,133,423 | 7/1962 | Germany. |

JOHN W. CALDWELL, *Primary Examiner.*

R. L. RICHARDSON, *Assistant Examiner.*